No. 610,810. Patented Sept. 13, 1898.
M. J. HAWLEY & J. B. CLOT.
MACHINE FOR CUTTING MARBLE OR OTHER STONE.
(Application filed Dec. 15, 1897.)
(No Model.)
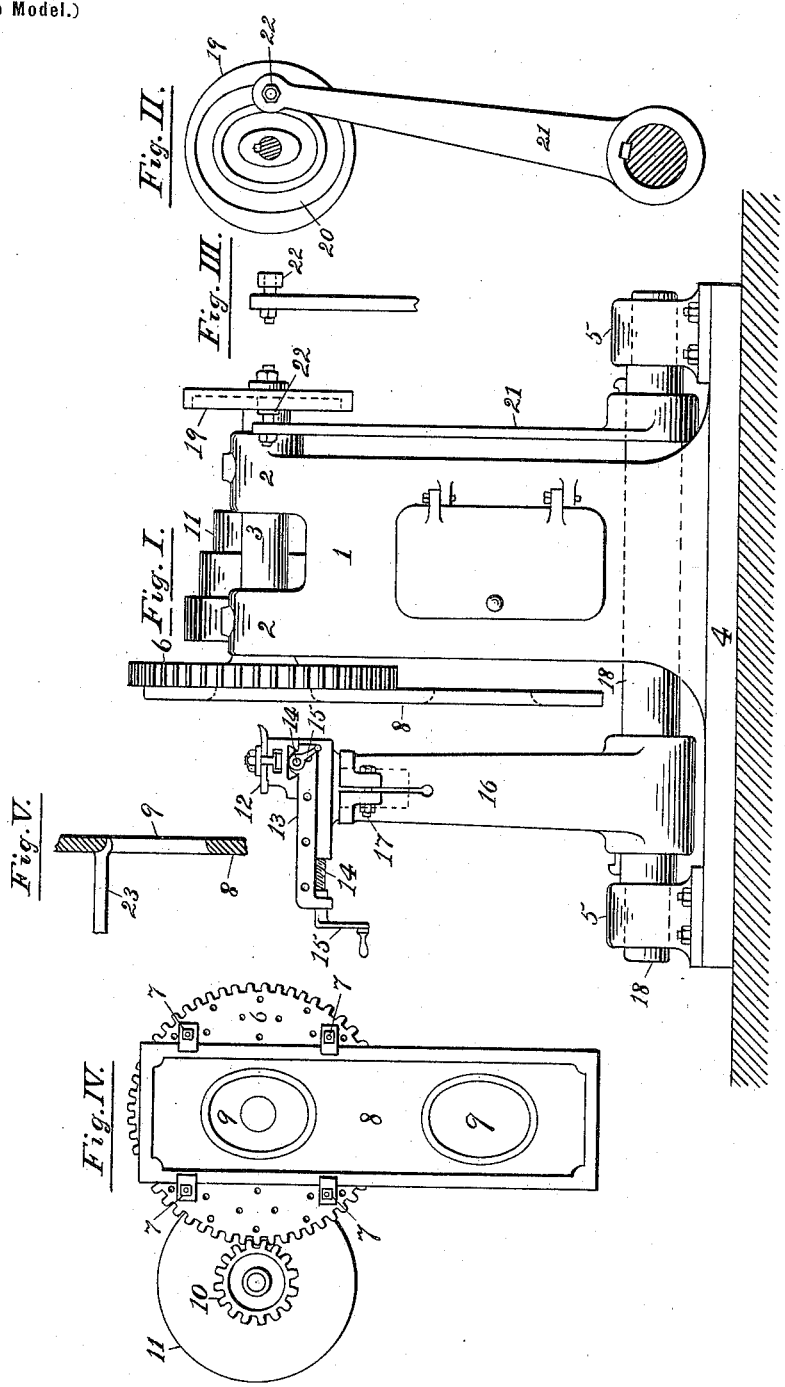
Witnesses
K. Lockwood Nevins.
H. Sanderson,
Inventors
M. J. Hawley and
John B. Clot
By their Attorneys
J. Richards & Co.
THE NORRIS PETERS CO., PHOTO-LITHO., WASHINGTON, D. C.

UNITED STATES PATENT OFFICE.

M J HAWLEY AND JOHN B. CLOT, OF SAN FRANCISCO, CALIFORNIA.

MACHINE FOR CUTTING MARBLE OR OTHER STONE.

SPECIFICATION forming part of Letters Patent No. 610,810, dated September 13, 1898.

Application filed December 15, 1897. Serial No. 661,938. (No model.)

*To all whom it may concern:*

Be it known that we, M J HAWLEY and JOHN B. CLOT, citizens of the United States, residing at San Francisco, county of San Francisco, and State of California, have invented certain new and useful Improvements in Machines for Cutting Marble or other Stone; and we hereby declare the following to be a full, clear, and exact description of the same, reference being had to the accompanying drawings, forming a part of this specification.

Our invention relates to a machine for cutting apertures of a circular, oval, or other form bounded by curves through marble or other stone and for molding the edges of such apertures.

Our improvements consist of a strong spindle arranged in the manner of a lathe, provided with a face-plate on which are clamped the slabs of marble or other stone to be cut, and a cutting-tool mounted on an oscillating shaft operated by a cam on the main spindle, so that the cutting-tool will have a transverse movement across the axis of the slab's rotation and coincident with its revolution, whereby holes of a circular or other curved symmetrical form can be cut through the slab and the edges be trimmed or molded.

The objects of our invention are to obtain accuracy of size and contour for such apertures, to uniformly shape or mold the edges of the same, and to perform this work in a rapid manner without the exercise of special skill.

To these ends we provide a machine as shown in the drawings herewith, forming a part of this specification, in which—

Figure I is a side elevation of a machine for cutting holes in marble or other slabs of stone constructed according to our invention. Fig. II is a view in elevation of the face of a cam-wheel for cutting oval holes and the lever that operates the oscillating bar on which the cutting-tools are supported. Fig. III is a detail of Fig. I, showing an edge view of the guide-roller that moves in the cam-plate. Fig. IV is a front view of a slab in which oval apertures have been cut, the revolving face-plate on which the slab is mounted, and the main driving-gearing. Fig. V is a detail showing the manner of shaping and molding the edges of holes or apertures after cutting through a slab.

In cutting holes or apertures through slabs of stone, especially marble tops for toilet-basins and the like, it is desirable that such apertures have a true contour and be symmetrical in form; also when two or more holes or apertures are cut in one slab that their position, shape, and dimensions be uniform. These ends are attained by our improved machine in a simple and efficient manner, as will now be explained.

Referring to the drawings, 1 is the main frame, preferably a strong pedestal of iron, provided at the top with bearings 2 to receive the main spindle 3 and at the bottom with a sole-plate 4 to receive the bearings 5, as seen in Fig. I.

On the front end of the main spindle 3 is fastened a strong face-plate 6, which may also form a driving gear-wheel, as shown. On the face of this plate 6 by means of clamps 7 or in any other suitable manner is fastened the slab 8 to be cut. This slab 8 is adjusted so the center of one of the holes 9 to be cut will coincide with the axis of the spindle 3, such adjustment being made by means of lines marked on the slab 8 and on the face-plate 6 by gages bolted on the face-plate or in any of the methods common for such adjustments.

The face-plate 6 is driven by a pinion 10 and the step-pulleys 11, so as to adjust the speed of revolution to the size of the holes 9 or the hardness of the material to be cut.

The cutting-tools 12 are held on a compound slide-rest 13, moved by screws 14 and handles 15 in the usual manner. This slide-rest 13 is supported by a cylindrical shank that fits in the top of the standard 16 and is clamped by a screw 17, so that the tool 12 by swiveling the slide-rest can be advanced at any desired angle to the face of the slab 8.

The tool-supporting standard 16 is mounted on a strong shaft 18, that passes through the column 1 and is held in the bearings 5, as seen in Fig. I.

On the rear end of the main spindle 3 are mounted exchangeable cams or contour-wheels 19, in the faces of which are formed grooves 20, of any desired shape, corresponding in their deviations from a true circle, or with ordinates, the same as is required in the holes 9. The one shown in Fig. II is a plain oval to produce holes as shown in Fig. IV.

On the shaft 18 there is fastened a stiff lever 21, provided at its end with a guide-roller 22, that fits in the groove 20, so that the lever 21, the shaft 18, and the tools 12 are given a movement corresponding to the eccentricity or other shape of the groove 20 coincident with the revolutions of the spindle 3 and the slab 8, so that when the tool 12 is advanced it cuts through the slab 8 a hole corresponding to the shape of the groove 20.

The cam-wheels 19 are changed when different-formed holes are to be cut, the grooves 20 being varied accordingly, the arrangement of the parts being such as to permit such a change in a few minutes' time.

When the holes 9 are cut through the slab 8, the edges are rough and unsymmetrical. The tools 12 are then changed, and a chamfering-tool 23 is applied, as shown in Fig. V, to produce a curved or other form of the edges, as may be desired.

Water is used to prevent heating and improve the action of the tools, and when the adjustments of the machine are learned the work can be carried on rapidly without special skill on the part of an operator.

Having thus described the nature and objects of our invention and the manner of applying the same, what we claim as new, and desire to secure by Letters Patent, is—

1. In combination, an upright stationary main pedestal, a horizontal revoluble spindle mounted thereon, bearing at one end a face-plate with clamping means attached, and at the other end a cam-faced pattern-wheel, means for rotating said spindle, a horizontal rock-shaft supported at the base of the machine, a rocking arm engaging with said pattern-wheel, a rocking standard 16, both sustained upon said rock-shaft, and a cutting tool or tools 12, borne on said rocking standard, with means for advancing and retracting said tool toward and from said face-plate, substantially as specified.

2. In combination, a main pedestal, a horizontal revoluble spindle mounted thereon, bearing a face-plate with means for clamping the material thereto, and a pattern-wheel with cam-grooves in its vertical face, means for rotating said face-plate and said pattern-wheel simultaneously, a rock-shaft bearing two oscillating arms, one engaging the cam-groove of the pattern-wheel, and the other serving as a tool-support, the two oscillating arms moving in unison, and a slide-rest borne on said tool-support, with means for carrying a tool and means for horizontal adjustment of said tool both longitudinally and laterally, substantially as specified.

3. In combination, a main pedestal, a horizontal revoluble spindle mounted thereon, bearing a face-plate with clamps, and a removable pattern-cam, with means for rotating the same simultaneously, two rocking arms connected so as to oscillate in unison, one engaging with said cam, and the other bearing a slide-rest, a removable and adjustable tool borne on said rest, with means for adjusting the said tool in two directions, substantially as specified.

In testimony whereof we have hereunto affixed our signatures in the presence of witnesses.

M J HAWLEY.
JOHN B. CLOT.

Witnesses:
K. LOCKWOOD-NEVINS,
H. SANDERSON.